US010097242B2

(12) United States Patent
Schwager

(10) Patent No.: US 10,097,242 B2
(45) Date of Patent: *Oct. 9, 2018

(54) POWER LINE COMMUNICATION APPARATUS INCLUDING AC POWER SOCKET

(71) Applicant: SONY CORPORATION, Tokyo (JP)

(72) Inventor: Andreas Schwager, Waiblingen (DE)

(73) Assignee: SONY CORPORATION, Tokyo (JP)

( * ) Notice: Subject to any disclaimer, the term of this patent is extended or adjusted under 35 U.S.C. 154(b) by 206 days.

This patent is subject to a terminal disclaimer.

(21) Appl. No.: 14/855,957

(22) Filed: Sep. 16, 2015

(65) Prior Publication Data

US 2016/0006482 A1    Jan. 7, 2016

Related U.S. Application Data

(63) Continuation of application No. 13/352,788, filed on Jan. 18, 2012, now Pat. No. 9,172,433.

(30) Foreign Application Priority Data

Feb. 7, 2011 (EP) .................................. 11000956

(51) Int. Cl.
*H04B 3/56* (2006.01)
*H01R 13/719* (2011.01)

(52) U.S. Cl.
CPC ............. *H04B 3/56* (2013.01); *H01R 13/719* (2013.01); *H04B 2203/5454* (2013.01); *H04B 2203/5491* (2013.01)

(58) Field of Classification Search
CPC ....................................................... H04B 3/56
See application file for complete search history.

(56) References Cited

U.S. PATENT DOCUMENTS 5,805,053 A    9/1998  Patel et al.
6,747,859 B2    6/2004  Walbeck et al.
(Continued)

FOREIGN PATENT DOCUMENTS

EP    1 617 538 A1    1/2006
EP    1 816 755 A2    8/2007
(Continued)

OTHER PUBLICATIONS

Office Action dated Dec. 14, 2015 in Russian Patent Application No. 2012103308.
Extended European Search Report dated Mar. 20, 2012 in Patent Application No. 11008948.9.
(Continued)

*Primary Examiner* — Rexford Barnie
*Assistant Examiner* — David Shiao
(74) *Attorney, Agent, or Firm* — Xsensus, LLP

(57) ABSTRACT

A power line communication apparatus includes a mains power connector assembly with three or more first connectors connectable to a mains distribution network. A mains filter provides a filter path between each of its first ports and a corresponding one of second ports, wherein each first port is connected to one of the first connectors. Each second port is connected to one of three or more second connectors of an AC power socket. A power line communication unit is connected with each of the first ports and transmits and/or receives data according to a transmission method using more than one transmission channel between two devices connected via the mains distribution network. The mains filter improves PLC transmission quality by suppressing disturbances generated by the appliances and reduces PLC stray radiation.

16 Claims, 3 Drawing Sheets

(56) References Cited

U.S. PATENT DOCUMENTS

| | | |
|---|---|---|
| 6,842,668 B2 | 1/2005 | Carson et al. |
| 6,987,430 B2 | 1/2006 | Wasaki et al. |
| 7,199,699 B1 | 4/2007 | Gidge |
| 7,795,994 B2 | 9/2010 | Radtke |
| 2002/0060617 A1 | 5/2002 | Walbeck et al. |
| 2008/0190639 A1 | 8/2008 | Baran et al. |
| 2009/0002094 A1 | 1/2009 | Radtke |
| 2010/0019862 A1 | 1/2010 | Feng et al. |
| 2011/0206140 A1 | 8/2011 | Schwager et al. |

FOREIGN PATENT DOCUMENTS

| | | |
|---|---|---|
| EP | 2 157 704 A1 | 2/2010 |
| WO | WO 2010/020298 A1 | 2/2010 |

OTHER PUBLICATIONS

Chinese Office Action and Search Report dated Nov. 2, 2014 in Patent Application No. 2012100239583 (with English language translation).

Chan K., "Design of Differential Filters for High-Speed Signal Chains", published Apr. 2010, Texas Instruments, retrieved from <http://www.ti.com/litian/slwa053b/slwa053b.pdf> on Mar. 25, 2015.

Kuphaldt T. R., "Lessons in Electric Circuits—vol. II: Chapter 8: Filters", as published Nov. 25, 2010 as retrieved by web.archive.org, retrieved from <http://web.archive.org/web/20101125065637/http://www.ibiblio.org/kuphaldtielectricCircuits/AC/ AC_8. html> on Mar. 25, 2015.

"Electronic filter topology", as published Jun 9, 2010 as retrieved by web.archive.org, retrieved from <http://web.archive.org/web/20100609061703/http://en.wikipedia.org/wiki/Cauer_topology_(electronics)#Ladder_topologies>, retrieved Aug. 15, 2014.

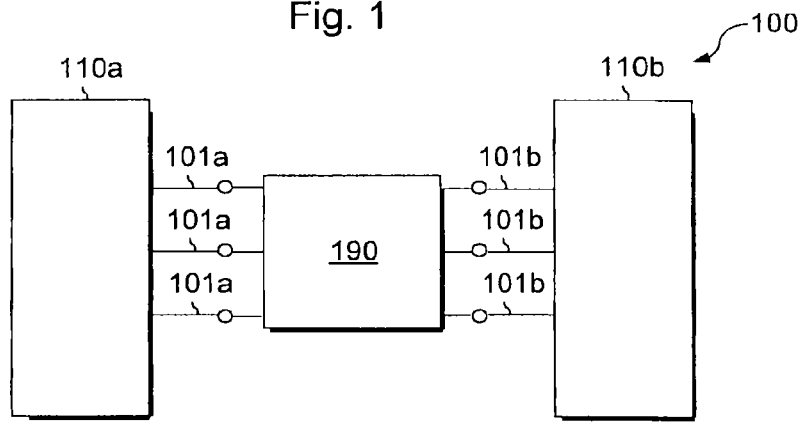
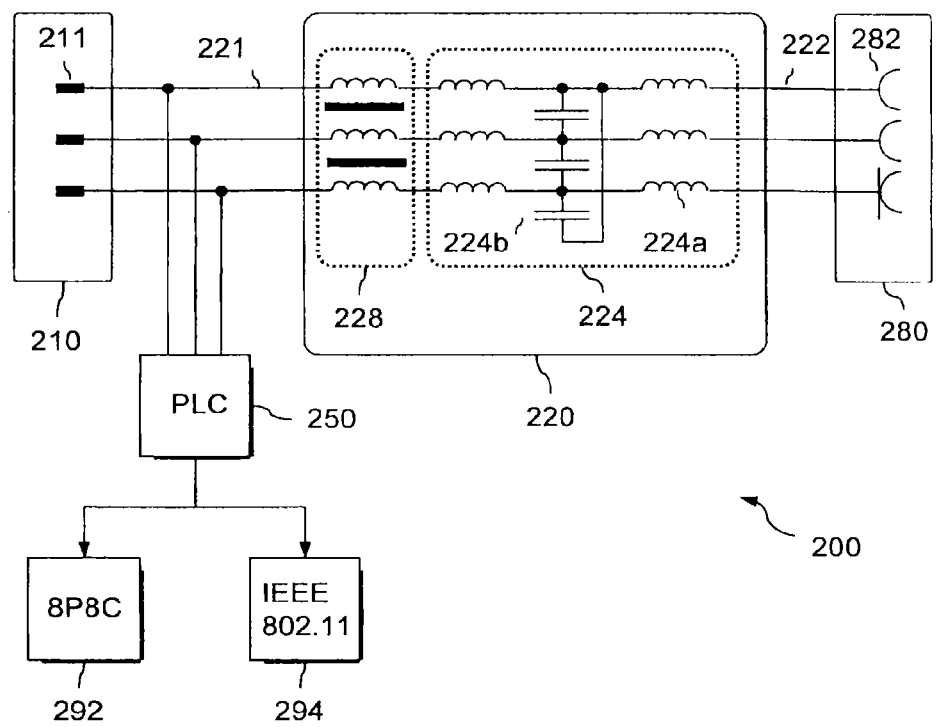

US 10,097,242 B2

POWER LINE COMMUNICATION APPARATUS INCLUDING AC POWER SOCKET

CROSS-REFERENCE TO RELATED APPLICATIONS

This application is a continuation application of U.S. application Ser. No. 13/352,788, filed Jan. 18, 2012, which is in turn based upon and claims the benefit of priority from European Patent Application No. 11000956.0, filed on Feb. 7, 2011, the entire contents of each of which are incorporated herein by reference.

DESCRIPTION

Embodiments of the invention refer to a power line communication apparatus comprising an AC (alternating current) power socket and a method of operating a power line communication apparatus.

Some communications systems like PLC (power line communications) use power distribution systems for data communication, wherein a modulated carrier is superimposed to the 50 or 60 Hz alternating current of the power lines. For example, a power cable containing two or more electrical conductors is used for transmission of AC (alternating current) electric power, wherein the power cable may be installed as permanent wiring within buildings or may be buried in the ground. Power line communication modems may be plugged into any outlet of the power distribution system.

The object of the invention is to increase ease of use of a power line communication system. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

FIG. 1 is schematic block diagram of a power line communications system comprising a power line communication apparatus in accordance with an embodiment of the invention.

FIG. 2 is a schematic block diagram showing details of a power line communication apparatus with a mains filter in accordance with another embodiment of the invention.

Figure 3A:
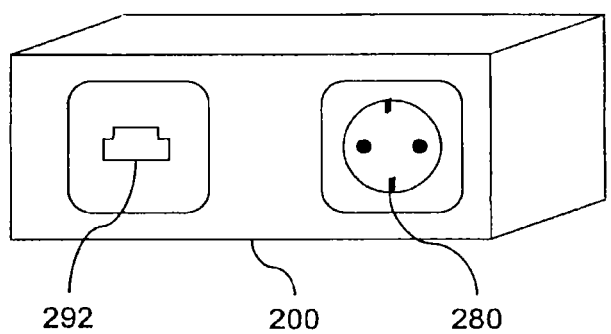
FIG. 3A is a simplified perspective view of a power line communication apparatus in accordance with an embodiment related to a wall-mounted outlet.

FIG. 1 refers to a communications system 100 using a power distribution system 190 for data communication. By way of example, the communications system 100 may be a power line communications (PLC), mains communications, power line telecommunications (PLT), broadband power line (BPL) or power band or power line networking (PLN) system using a modulated carrier superimposed to the 50 or 60 Hz alternating current of the power lines respectively.

The communications system 100 is operable as a MIMO (multiple input multiple output) or MISO (multiple input single output) system with at least a first and a second modem device 110a, 110b. The first modem device 110a outputs data signals at two or more first interface ports 101a. The second modem device 110b recovers the data signals from signals received at three or more second interface ports 101b. The power distribution system 190 forms the transmission channel connecting the first and second modem devices 110a, 110b. The power distribution system 190 represents a multi-wire connection. For example, the power distribution system 190 may include power cables comprising two or more electrical conductors used for transmission of AC electric power (mains) and for providing earth connection, wherein the power cables may be installed as permanent wiring within buildings or may be buried in the ground.

For example, the first modem device 110a may output two differential transmit signals using the live or phase wire (L, P), the neutral wire (N), and protective earth (PE), wherein the differential transmit signals are modulated on a carrier superposing the AC frequency on the mains voltage. The second modem device 110b may receive three differential receive signals between live wire and neutral wire, between neutral wire and protective earth, and between live wire and protective earth. According to another embodiment, the second modem device 110b may receive the three differential receive signals and a common mode signal resulting from a leakage current from the wiring as a fourth receive signal. The transmit signals in the transmission channel 190 interfere with each other through capacitive coupling between the wires such that the first and second modems may use multi-channel techniques like beamforming for enhancing transmission throughout.

One of the first and second modem devices 110a, 110b is a power line communication apparatus 200 as illustrated in FIG. 2. The other modem device 110a, 110b may also be of the type of the power line communication apparatus 200, another stand-alone type PLC modem or may be integrated in an electronic device for consumer applications, for example in a storage unit, a television set, an audio receiver, a video recorder, or in sensor devices.

As shown in FIG. 2, the power line communication apparatus 200 comprises a mains power connector assembly 210 with at least three first connectors 211. Each of the first connectors 211 is adapted to connect the power line communication apparatus 200 to one of the wirings L1, L2, L3, N, PE of a power distribution system. According to an embodiment the first connectors 211 are terminals, for example clamps or connector blocks into which the wirings L1, L2, L3, N, PE may be clamped. According to another embodiment, the mains power connector assembly 210 is a mains power plug where at least two of the first connectors 211 assigned to live and neutral connections are pins or prongs. The mains power plug may be a standardized one, for example a mains power plug in accordance with the CEE 7/4, 7/5, 7/7, NEMA5-nn or SEV1011 standard.

The power line communication apparatus 200 further includes a mains filter 220 with at least three first ports 221 and a corresponding number of second ports 222. Each first port 221 is electrically connected to one of the first connectors 211. According to an embodiment each first port 221 is directly connected with the corresponding first connector 211 in a low resistive manner through wires, conductors, and/or clamps. The mains filter 220 comprises a low-pass filter path between each first port 221 and a corresponding one of the second ports 222.

An AC power socket (receptacle) 280 comprises at least three second connectors 282, wherein each second connector 282 is electrically connected to one of the second ports 222 of the mains filter 220. At least two of the second connectors 282 assigned to live and neutral connections are female connectors. The AC power socket 280 may by standardized and may comply with any of the CEE 7/4, 7/5, 7/7, NEMA5-nn or SEV1011 standards, by way of example. In case the mains power connector assembly 210 is a standardized mains power plug, the AC power socket 280 may comply with the same standard. A power strip or an electric/electronic appliance may be plugged into the AC power socket to connect an electric/electronic appliance to the mains power distribution system.

A power line communication unit 250 is electrically connected with each of the first connectors 211 and first ports 221, wherein the power line communication unit 250 is configured to transmit and/or receive data according to a transmission method using more than one wired connection or transmission path between two devices connected via the power distribution wiring. The power line communication unit 250 includes a power lines communication modem that may be configured as a receiving device, as a transmitting device or as bidirectional communication device incorporating the functionalities of both a receiving and a transmitting device. The power lines communication modem may be a PLC modem, a mains communications modem, a PLT modem, a BPL modem or a power band or PLN modem.

The power line communication apparatus 200 with integrated AC power socket 280 and mains filter 220 allows the user to easily install or plug a power line modem into any outlet which is convenient to access for him and without that the outlet is lost for connecting further electric/electronic appliances. The data signals go directly from the integrated power line communication unit 250 to the wall outlet and the power distribution wiring. Neither do they radiate nor are they attenuated by the cable resistance of a multiple-outlet power strip, which often has to be installed for providing a sufficient number of outlets for appliances and modems.

In addition, the mains filter 220 suppresses disturbances and noise from appliances connected to the AC power socket 280. Since Appliances connected to the filtered AC power socket 280 cannot cause asymmetry to the mains at the respective outlet, differential mode MIMO signals of the power line communication unit 250 are not converted into common mode signals that may radiate from the mains. Hence the system emits less stray radiation.

According to an embodiment, at least one of the first connectors 211 of the mains power connector assembly 210 is an earth (grounding) connection and at least one of the second connectors 282 of the AC power socket 280 is an earth connection. The filter paths may differ in their effect on the assigned wired connection. According to an embodiment each filter path provides interference suppression. For example, each filter path provides interference suppression to approximately the same degree.

In accordance with an embodiment, the mains filter 220 includes a low-pass filter 224 which is effective on each of the at least three filter paths. Where one of the filter paths provides an earth connection, the low-pass filter 224 is also effective on this filter path approximately to the same degree. For example, the low-pass filter 224 includes filter elements in each of the filter paths, including a filter path assigned to an earth connection, wherein corresponding filter elements of different filter paths have the same nominal values such that all at least three filter paths are configured in the same way. According to an embodiment, the low-pass filter 224 attenuates signal frequencies above 1 MHz, for example in the range between 2 and 30 MHz by at least 3 dB, for example 6 dB, 10 dB or 20 dB. According to an embodiment the attenuation is at least 50 dB. According to other embodiments, the mains filter 220 attenuates another frequency-range above a frequency greater 2 MHz to comply with the specific frequency range of the powerline communication unit 250.

The low-pass filter 224 may contain serial filter elements 224a in each filter path. The serial filter elements 224a may differ from each other. In accordance with an embodiment, the serial filter elements 224a in each filter path may be elements that are approximately equivalent to each other with regard to the effect they have. For example, each serial filter element 224a may be effective as a low-pass filter that lets pass the 50 Hz or 60 Hz AC frequency and that blocks HF (high frequency) and VHF (very high frequency). The low-pass filter 224 may provide the same filter degree and the same cutoff frequencies in each filter path. Each serial filter element 224a may include one or more inductors, wherein corresponding inductors in different filter paths may have the same nominal values for inductivity and resistance. The low-pass filter 224 may also comprise a number of capacitive units 224b, wherein each capacitive unit 224b is electrically arranged between each pair of filter paths. Each capacitive unit 224b may provide a parallel filter path with a cutoff frequency defining a pass-band effective up to at least 50 Hz or 60 Hz and blocking HF and VHF. Each capacitive unit 224b may include one ore more capacitors. According to an embodiment, at 1 MHz each filter path may provide an attenuation of at least 40 dB. Each capacitive unit 224b may be connected to a node between two identical inductors of the same filter path, respectively.

According to an embodiment the mains filter 220 may also include a common-mode filter unit 228 to attenuate common mode signals. The common filter unit 228 may include a common mode choke, a ferrite bead or ring. The common filter unit 228 is effective on each of the at least three filter paths in the same way and to the same degree. For example, elements with the same nominal values for inductivity, resistance and coupling values may be provided in each filter path such that all at least three filter paths are configured in the same way. Where one of the filter paths provides an earth connection, the elements are provided in this filter path, too.

The power line communication apparatus 200 may have four first connectors 211 for two live connections L1, L2, a neutral connection N and an earth connection, or five connectors for three live connections L1, L2, L3, a neutral connection N and an earth connection PE. According to an embodiment, the power plug comprises three first connectors 211 for one live connection L, a neutral connection N and the earth connection PE.

The power line communication apparatus 200 may further comprise a data outlet 292 connected to the power line communication unit 250, wherein the power line communication unit 250 outputs data received via the mains power connector assembly 210 at the data outlet 292 and/or outputs data received via the data outlet 292 at the mains power connector assembly 210. The data outlet 292 may be a standardized one, for example according to the USB, Ethernet, Firewire or any other wired communication standard.

Alternatively or in addition, the power line communication apparatus 200 may comprise a wireless modem 294 connected to the power line communication unit 250, wherein the power line communication unit 250 outputs data received via the mains power connector assembly 210 via the wireless modem 294 and/or outputs data received via the wireless modem 294 via the mains power connector assembly 210. The wireless modem may be a standardized one and may comply with the IEEE 802.11 standard by way of example.

FIG. 3A shows an on-wall or in-wall mounted power line communication apparatus 200 with an AC power socket 280, which may be a CEE 7/7 socket, and a data outlet 292, which may be a female modular connector, like a 8P8C jack (socket). Terminals at the backside oriented to the wall side provide interfaces to the power distribution wiring.

Figure 3B:
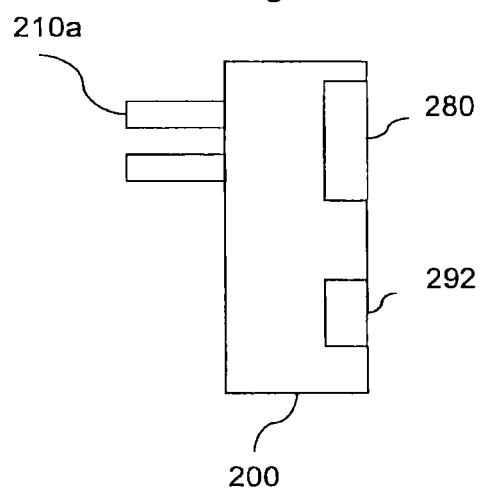
FIG. 3B is a simplified side view of a power line communication apparatus including a mains power plug in accordance with an embodiment.

FIG. 3B shows a plug-in power line communication apparatus 200 with an AC power socket 280, a data outlet 292, and a mains power plug 210a, which may be CEE 7/7 plug, by way of example.

Figure 4:
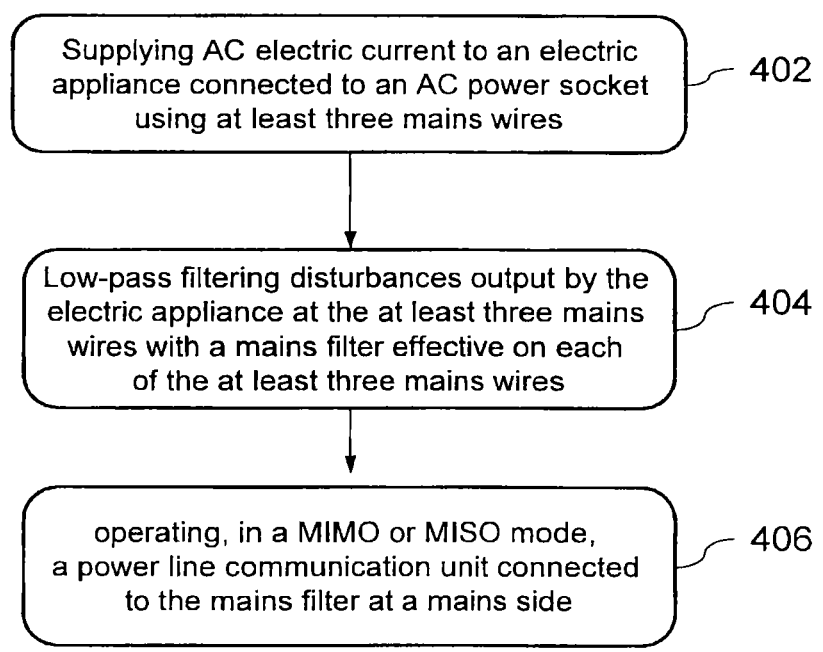
FIG. 4 is a simplified flowchart of a method of operating a power line communication apparatus according to a further embodiment.

FIG. 4 refers to a method of operating a power line communication apparatus. AC electric current is supplied to an electric appliance connected to an AC power socket using at least three mains connections (402). The at least three mains connections may provide two live connections and a neutral connection. According to an embodiment one of the at least three mains connections provides an earth connection. Noise and disturbances output by the electric appliance at the mains connections are low-pass filtered using a mains filter effective on each of the at least three mains connections (404) in the same way. According to an embodiment, each low-pass filter path of the mains filter provides interference suppression. The mains filter has a mains side oriented to the mains and an appliance side oriented to the AC power socket. A power line communication unit that is connected to the mains side of the mains filter is operated in a MIMO or MISO mode (406). The mains filter attenuates signal frequencies in the range used by the powerline communication unit and may attenuate common mode signals.

The invention claimed is:

1. A power line communication apparatus comprising:
   a mains power connector assembly comprising at least three first connectors;
   an AC power socket comprising at least three second connectors;
   power line communication circuitry electrically connected with each of the first connectors, wherein the power line communication circuitry is configured to transmit and/or receive data according to a transmission method; and
   a mains filter having at least three first ports, at least three second ports, and at least three filter paths, the mains filter including
      the first ports being electrically connected to the first connectors, respectively,
      the second ports being electrically connected to the second connectors, respectively,
      each of the filter paths being respectively provided between a corresponding first port of the at least three first ports and a corresponding second port of the at least three second ports, and the filter paths being respectively symmetric with respect to each other,
      a low-pass filter including respective electrical elements between each pair of the filter paths to attenuate interference signals transmitted along respective pairs of the filter paths, and
      the mains filter being configured to reduce radiation of the transmitted and/or received data on mains power lines by attenuating the interference signals transmitted along respective pairs of the filter paths that are received at the AC power socket and transmitted from the first ports to the second ports.

2. The apparatus according to claim 1, wherein the mains filter is further configured to reduce the radiation of the transmitted and/or received data on the mains power lines by attenuating asymmetric interference signals received at the AC power socket and transmitted from the first ports to the second ports.

3. The apparatus according to claim 2, wherein the mains filter is further configured to attenuate the asymmetric interference signals using a common-mode choke.

4. The apparatus according to claim 1, wherein, for each pair of the filter paths, the mains filter is configured to attenuate by a predefined amount and within a predefined frequency range the interference signals transmitted along respective pairs of the filter paths.

5. The apparatus according to claim 1, wherein the mains filter further includes
   the low-pass filter that attenuates by a predefined amount high-frequency components of the interference signals transmitted along respective pairs of the filter paths, for each pair of the filter paths, and
   a common-mode choke arranged between the low-pass filter and the second ports, the common-mode choke reducing asymmetry in the interference signals transmitted between the first ports and the second ports, and thereby reducing the radiation of the transmitted and/or received data on the mains power lines.

6. The apparatus according to claim 1, wherein the power line communication circuitry is configured to transmit and/or receive the data according to a transmission method that is a differential-mode, multiple-input-multiple-output (MIMO) or multiple-input-single-output (MISO) method using more than one transmission channel, wherein each transmission channel uses at least two lines of the mains power lines.

7. The apparatus according to claim 1, wherein
   the mains power connector further includes that one of the first connectors is configured to be a protective earth connection,
   the mains filter further includes that one of the filter paths is configured to be a protective earth filter path, and
   the AC power socket further includes that one of the second connectors is configured to be a protective earth connection.

8. The power line communication apparatus of claim 1, wherein the mains power connector assembly is a mains power plug.

9. The apparatus of claim 1, wherein the mains filter includes the low-pass filter arranged to provide a same degree of interference suppression in each of the filter paths.

10. The apparatus of claim 1, wherein the low-pass filter further includes that the respective electrical elements between each pair of the filter paths are parallel capacitive elements, and the low-pass filter includes series inductive elements in each of the filter paths, and an inductance is a same value for each of the series inductive elements.

11. The power line communication apparatus of claim 1, wherein, at 1 MHz, each of the filter paths provides a same attenuation of at least 50 dB.

12. The power line communication apparatus of claim 1, wherein the mains power connector assembly comprises not more than three first connectors.

13. The power line communication apparatus of claim 1, further comprising
   a data outlet connected to the power line communication circuit, the power line communication circuit configured to output data received via the mains power connector assembly at the data outlet and/or to output data received via the data outlet at the mains power connector assembly.

14. The apparatus of claim 1, wherein the mains filter is configured to filter each pair of the filter paths with equivalent attenuation and dispersion as a function of frequency.

15. The power line communication apparatus of claim 1, further comprising
a wireless modem connected to the power line communication circuit, the power line communication circuit configured to output data received via the mains power connector assembly through the wireless modem and/or to output data received via the wireless modem at the mains power connector assembly.

16. A method of operating a power line communication apparatus, the method comprising:
supplying alternating current (AC) electric current to an electric appliance connected to an AC power socket using at least three mains connections, wherein one of the at least three mains connections is configured to be a protective earth connection,
filtering noise and disturbances output by the electric appliance at the at least three mains connections with a mains filter that filters respective filter paths of the at least three mains connections, the mains filter having a mains side oriented to the least three mains connections and an appliance side oriented to the AC power socket, the filter paths being respectively symmetric with respect to each other, and the mains filter including a low-pass filter having respective electrical elements between each pair of the filter paths to attenuate interference signals transmitted along respective pairs of the filter paths, wherein the mains filter reduces radiation of the transmitted and/or received data on mains power lines by attenuating asymmetric interference signals received at the electric appliance; and
operating, in differential mode and a multiple-input-multiple-output (MIMO) or multiple-input-single-output (MISO) mode, a power line communication circuit connected to the mains filter at the mains side.

* * * * *